(12) United States Patent
Tseng

(10) Patent No.: US 9,331,787 B2
(45) Date of Patent: May 3, 2016

(54) OPTICAL COMMUNICATION DEVICE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 70 days.

(21) Appl. No.: 14/277,795

(22) Filed: May 15, 2014

(65) Prior Publication Data

US 2014/0341590 A1    Nov. 20, 2014

(30) Foreign Application Priority Data

May 15, 2013    (TW) .............................. 102117291 A

(51) Int. Cl.
| | | |
|---|---|---|
| *H04B 10/40* | (2013.01) | |
| *H04B 10/43* | (2013.01) | |
| *G02B 6/42* | (2006.01) | |

(52) U.S. Cl.
CPC .............. *H04B 10/40* (2013.01); *G02B 6/4202* (2013.01); *G02B 6/4281* (2013.01)

(58) Field of Classification Search
CPC .... H04B 10/40; H04B 10/43; H04B 10/4202; H04B 10/4281; G02B 6/4202; G02B 6/4281
USPC .................. 398/135, 138, 139, 164
See application file for complete search history.

(56) References Cited

U.S. PATENT DOCUMENTS

| | | | | |
|---|---|---|---|---|
| 6,195,485 | B1* | 2/2001 | Coldren ............... | G02B 6/4202 385/49 |
| 7,352,935 | B2* | 4/2008 | Furuyama ............... | G02B 6/25 385/14 |
| 8,164,043 | B2* | 4/2012 | Tamura ............... | G02B 6/4202 250/227.11 |
| 2005/0169639 | A1* | 8/2005 | Shen .................... | G02B 6/4212 398/164 |

* cited by examiner

*Primary Examiner* — Dalzid Singh
(74) *Attorney, Agent, or Firm* — Novak Druce Connolly Bove + Quigg LLP

(57) ABSTRACT

An optical communication device includes a printed circuit board (PCB), a light emitting element, a light receiving element, and a light waveguide. The PCB includes a substrate. The substrate includes a first end surface and a second end surface opposite to the first end surface. The light emitting element is electrically connected to the first end surface. The light receiving element is electrically connected to the second end surface. The light waveguide includes a light incident end and a light emergent end. The light waveguide is embedded in the substrate. The light incident end is exposed to the first end surface and optically aligned with the light emitting element along a transmitting direction of the light waveguide. The light emergent end is exposed to the second end surface and optically aligned with the light receiving element along the transmitting direction of the light waveguide.

8 Claims, 1 Drawing Sheet

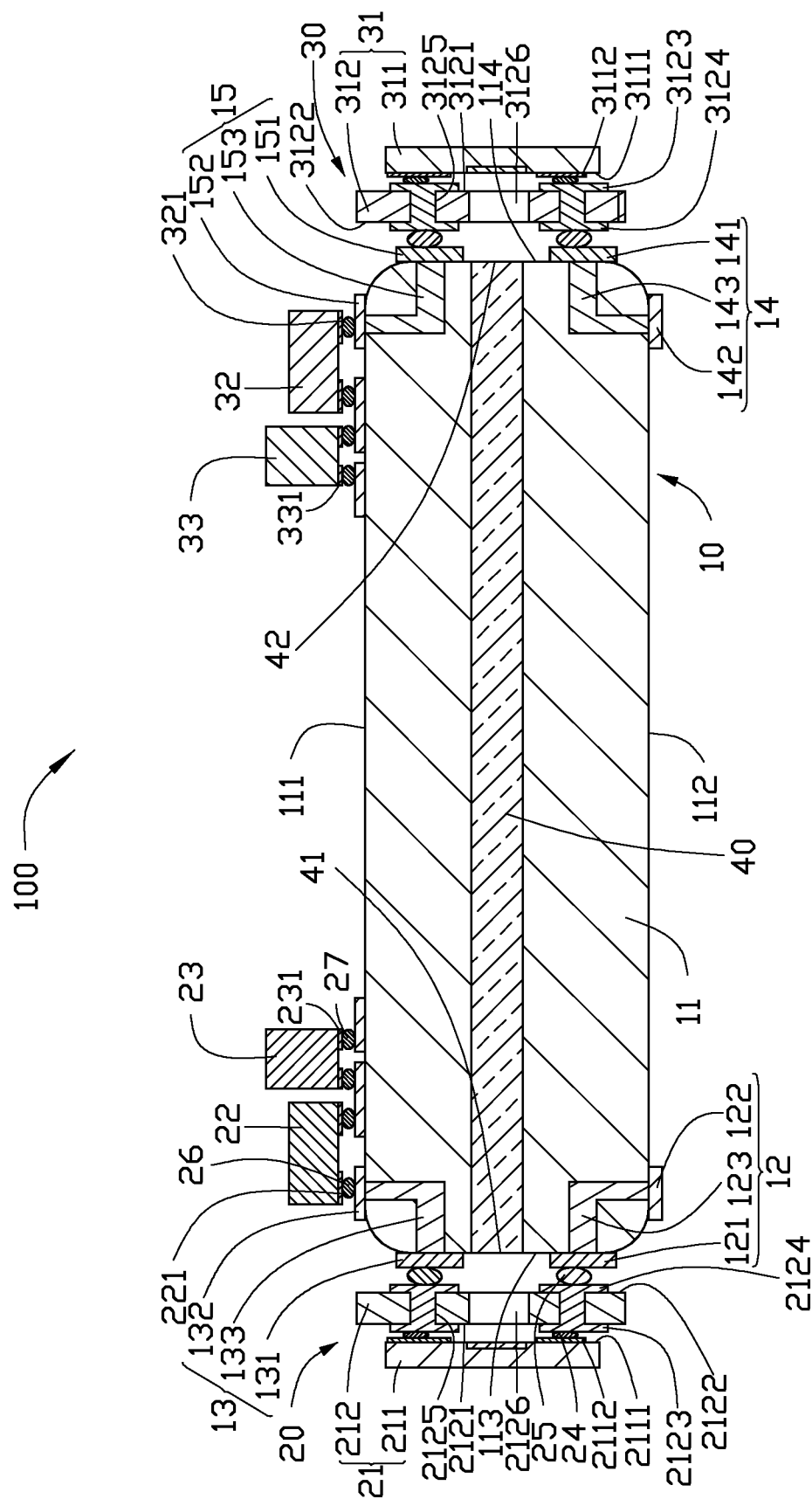

OPTICAL COMMUNICATION DEVICE

FIELD

The present disclosure relates to communication devices, and particularly to an optical communication device.

BACKGROUND

In optical communication devices, information is transmitted by an optical manner and processed by an electrical manner. An optical communication device generally includes a light emitter for emitting light signals, a light receiver for receiving light signals, and a light waveguide for transmitting optical signals between the light emitter and the light receiver.

BRIEF DESCRIPTION OF THE DRAWING

The components of the drawing are not necessarily drawn to scale, the emphasis instead being placed upon clearly illustrating the principles of the embodiments of the present disclosure.

The FIGURE is a schematic view of an embodiment of an optical communication device.

DETAILED DESCRIPTION

The disclosure is illustrated by way of example and not by way of limitation in the FIGURES of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

The FIGURE illustrates an exemplary embodiment of an optical communication device 100 of the present disclosure. The optical communication device 100 includes a printed circuit board (PCB) 10, a light emitting unit 20, a light receiving unit 30, and a light waveguide 40. The light waveguide 40 is located between the light emitting unit 20 and the light receiving unit 30.

The PCB 10 includes a substrate 11. The substrate 11 is made of flexible material and can be bent. In detail, the substrate 11 can be made of polyimide or polyester. The substrate 11 includes a first surface 111, a second surface 112 opposite to the first surface 111, a first end surface 113, and a second end surface 114 opposite to the first end surface 113. In this embodiment, the first surface 111 is substantially parallel to the second surface 112, and the first end surface 113 is substantially parallel to the second end surface 114. The first and second surfaces 111, 112 are substantially perpendicular to the first and second end surfaces 113, 114.

The PCB 10 includes a first connecting portion 12, a second connecting portion 13, a third connecting portion 14, and a fourth portion 15. The first connecting portion 12 and the second connecting portion 13 correspond to the light emitting unit 20, and the third connecting portion 14 and the fourth portion 15 correspond to the light receiving unit 30. The first connecting portion 12 includes a first connecting pad 121 on the first end surface 113, a second connecting pad 122 formed on the second surface 112, and a first wire 123 connecting the first connecting pad 121 to the second connecting pad 122. The second connecting portion 13 includes a third connecting pad 131 formed on the first end surface 113, a number of fourth connecting pads 132 formed on the first surface 111, and a second wire 133. The second wire 133 connects the third connecting pad 131 to one of the fourth connecting pads 132. The first wire 123 and the second wire 133 are embedded in the substrate 11.

The third connecting portion 14 is similar to the first connecting portion 12, and the fourth connecting portion 15 is similar to the second connecting portion 13. The third connecting portion 14 includes a fifth connecting pad 141 formed on the second end surface 114, a sixth connecting pad 142 formed on the second surface 112, and a third wire 143 connecting the fifth connecting pad 141 to the sixth connecting pad 142. The fourth connecting portion 15 includes a seventh connecting pad 151 formed on the second end surface 114, a number of eighth connecting pads 152 formed on the first surface 111, and a fourth wire 153. The fourth wire 153 connects the seventh connecting pad 151 to one of the eighth connecting pads 152.

The light emitting unit 20 includes a light emitting element 21, a first driver chip 22, and a first control chip 23. The light emitting element 21 is electrically connected to the first end surface 113, and the first driver chip 22 and the first control chip 23 are electrically connected to the first surface 111. The light emitting element 21, the first driver chip 22, and the first control chip 23 are electrically connected to each other by the second connecting portion 13. The light emitting element 21 includes an emitter 211 and a first board 212. The emitter 211 generates and emits optical signals. In this embodiment, the emitter 211 is a laser diode. The emitter 211 includes an emitting surface 2111 facing toward the first end surface 113 and a number of first pins 2112 on the emitting surface 2111. The first board 212 includes a first side surface 2121, a second side surface 2122 opposite to the first side surface 2121, a number of first soldering pads 2123 on the first side surface 2121, and a number of second soldering pads 2124 on the second side surface 2122. The first soldering pads 2123 correspond to the first pins 2112, and the second soldering pads 2124 correspond to the first soldering pads 2123. The first board 212 defines a number of first connecting holes 2125 and a first light hole 2126. Each first connecting hole 2125 corresponds to a first soldering pad 2123 and a second soldering pad 2124. The first connecting holes 2125 are filled with conductive material. Each first soldering pad 2123 is connected to a corresponding second soldering pad 2124 by the conductive material in a corresponding first connecting hole 2125. In this embodiment, the first board 212 is made of silicon, and the first connecting hole 2125 and the first light hole 2126 are defined by a through hole via (TSV) process.

The emitter 211 is connected to the first side surface 2121 of the first board 212 via a flip chip. In detail, the emitting surface 2111 faces toward the first side surface 2121, and the first pins 2112 are connected to the first soldering pads 2123 one-to-one. In this embodiment, each first pin 2112 is connected to a corresponding soldering pad 2123 by a first soldering ball 24. The first board 212 is connected to the first end surface 113 of the substrate 11, such that the second side surface 2122 faces toward the first end surface 113. In this embodiment, each second soldering pad 2124 is connected to a corresponding first connecting pad 121 or a corresponding third connecting pad 131.

The first driver chip 22 drives the emitter 211, and the first control chip 23 controls the emitter 211 to emit optical signals. The first driver chip 22 and the first control chip 23 are electrically connected to the first surface 111 and to each other by the second connecting pads 132. The first driver chip 22 and the first control chip 23 are both connected to the first surface 111 via a flip chip. In detail, the first driver chip 22 includes a number of second pins 221, and the first control chip 23 includes a number of third pins 231. The first driver chip 22 is connected to the first surface 111, such that the second pins 221 face toward the first surface 111, and each second pin 221 is connected to a corresponding fourth connecting pad 132. The first control chip 23 is connected to the first surface 111, such that the third pins 231 face toward the first surface 111, and each third pin 231 is connected to a corresponding fourth connecting pad 132. In this embodiment, each second pin 221 is connected to a corresponding fourth connecting pad 132 by a third soldering ball 26, and each third pin 231 is connected to a corresponding fourth connecting pad 132 by a fourth soldering ball 27.

The light receiving unit 30 includes a light receiving element 31, a second driver chip 32, and a second control chip 33. The light receiving element 31 is electrically connected to the second end surface 114, and the second driver chip 32 and the second control chip 33 are electrically connected to the first surface 111. The light receiving element 31, the second driver chip 32, and the second control chip 33 are electrically connected to each other by the fourth connecting portion 15. The light receiving element 31 includes a receiver 311 and a second board 312. The receiver 311 receives optical signals and converts the optical signals into electrical signals. In this embodiment, the receiver 311 is a photodiode. The receiver 311 includes a receiving surface 3111 facing toward the second end surface 114, and a number of fourth pins 3112 on the receiving surface 3111. The second board 312 is structured similar to the first board 212. The second board 312 includes a third side surface 3121, a fourth side surface 3122 opposite to the third side surface 3121, a number of third soldering pads 3123 on the third side surface 3121, and a number of fourth soldering pads 2124 on the fourth side surface 3122. The third soldering pads 3123 correspond to the fourth pins 3112, and the fourth soldering pads 2124 correspond to the third soldering pads 3123. The second board 312 defines a number of second connecting holes 3125 and a second light hole 3126. Each second connecting hole 3125 corresponds to a third soldering pad 3123 and a fourth soldering pad 3124. The second connecting holes 3125 are filled with conductive material. Each third soldering pad 3123 is connected to a corresponding fourth soldering pad 3124 by the conductive material in a corresponding second connecting hole 3125. In this embodiment, the second board 312 is made of silicon, and the second connecting hole 3125 and the second light hole 3126 are defined by a through hole via (TSV) process.

The receiver 311 is connected to the second board 312 by a manner similar to a manner of the emitter 211 connected to the first board 212. The second board 312 is connected to the second end surface 114 by a manner similar to a manner of the first board 212 connected to the first end surface 113.

The second driver chip 32 drives the receiver 311 to receive optical signals, and the second control chip 33 controls a display screen (not shown) to display signals according to the received optical signals. The second driver chip 32 and the second control chip 33 are electrically connected to the first surface 111 and to each other by the eighth connecting pads 152. The second driver chip 32 and the second control chip 33 are both connected to the first surface 111 via a flip chip. In detail, the second driver chip 32 includes a number of fifth pins 321, and the second control chip 33 includes a number of sixth pins 331. The fifth pins 321 and the sixth pins 331 are connected to corresponding eighth connecting pads 152. The second driver chip 32 and the second control chip 33 are connected to the eighth connecting pads 152 by a manner similar to a manner of the first driver chip 22 and the first control chip 23 connected to the fourth connecting pads 132.

The light waveguide 40 transmits optical signals therein. The light waveguide 40 includes a light incident end 41 and a light emergent end 42. The light waveguide 40 transmits optical signals along a direction substantially perpendicular to the light incident end 41 and the light emergent end 42. The light wave guide 40 is embedded in the substrate 11. The light incident end 41 is exposed from the first end surface 113, and the light emergent end 42 is exposed from the second end surface 114. The light incident end 41 is optically aligned with the emitter 211 through the first light hole 2126, and the light emergent end 42 is optically aligned with the receiver 311 through the second light hole 3126. The light waveguide 40 is a flexible light waveguide 40 and can be bent.

Because of the flexible character of the substrate 11 and the light waveguide 40, the optical communication device 100 is also flexible. The optical communication device 100 can be used in a terminal device (not shown), such as a computer. In detail, the optical device 100 can be used to connect a central processing unit (CPU) of the computer and a display screen of the computer, to transmit optical signals between the CPU and the display screen.

In use, the emitter 211 is driven by the first driving chip 22 and controlled by the first control chip 23 to emit optical signals. The optical signals pass through the first light hole 216 and enter into the light waveguide 40 through the light incident end 41 of the light waveguide 40. The light waveguide 40 transmits the optical signals to the light emergent end 42. The optical signals pass through the light emergent end 42 of the light waveguide 40 and enter into the receiver 311 through the second light hole 3126. The receiver 311 converts the optical signals into corresponding electrical signals. The second control chip 33 controls the display screen to display signals according to the received optical signals.

Because the emitter 211 and the receiver 311 face toward the light incident end 41 and the light emergent end 42 of the light waveguide 40, respectively, optical signals can be transmitted linearly along the light waveguide 40 between the emitter 211 and the receiver 311. Thus, there is no need to deflect the optical signals between the emitter 211 and the light waveguide 40, or between the light waveguide 40 and the receiver 311. Therefore, a transmitting efficiency of the optical communication device 100 can be enhanced. Further, an optical deflecting member can be eliminated from the optical communication device 100. Therefore, a cost of the optical communication device 100 is decreased.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical communication device, comprising:
a printed circuit board comprising a substrate, the substrate comprising a first end surface and a second end surface opposite to the first end surface;
a light emitting element electrically connected to the first end surface;
a light receiving element electrically connected to the second end surface; and
a light waveguide comprising a light incident end and a light emergent end, the light waveguide being embedded in the substrate, the light incident end being exposed to the first end surface and optically aligned with the light emitting element along a transmitting direction of the light waveguide, and the light emergent end being exposed to the second end surface and optically aligned with the light receiving element along the transmitting direction of the light waveguide, wherein the substrate comprises a first surface and a second surface opposite to the first surface, the first surface and the second surfaces are perpendicularly connected to the first end surface and the second end surface, the optical communication device comprises a first driver chip for driving the light emitting element, a second driver chip for driving the light receiving element, and a control chip for controlling the light emitting element to emit optical signals, all of the first driver chip, the second chip, and the control chip are positioned on the first surface, the first driver chip and the control chip are electrically connected to the light emitting element, and the second driver chip is electrically connected to the light receiving element.

2. The optical communication device of claim 1, wherein the printed circuit board comprises a first connecting portion, a second connecting portion, a third connecting portion, and a fourth portion, the light emitting element is electrically connected to the printed circuit board by the first connecting portion and the second connecting portion, and the light receiving element is electrically connected to the printed circuit board by the third connecting portion and the fourth connecting portion.

3. The optical communication device of claim 1, wherein the first connecting portion comprises a first pad formed on the first end surface, a second pad formed on the second surface, and a first wire connecting the first pad to the second pad, the second connecting portion comprises a third pad formed on the first end surface, a number of fourth pads formed on the first surface, and a second wire, the second wire connects the third pad to one of the fourth pads, the light emitting element is electrically connected to the printed circuit board by the first pad and the third pad, and the first driver chip and the control chip are electrically to the printed circuit board by the fourth connecting pads.

4. The optical communication device of claim 3, wherein the first wire and the second wire are embedded in the substrate.

5. The optical communication device of claim 1, wherein the light emitting element comprises an emitter and a first board, the first board is connected to the first end surface of the substrate, and the emitter is connected to the first board and is electrically connected to the printed circuit board by the first board.

6. The optical communication device of claim 5, wherein the first board defines a first light hole, the emitter is optically aligned with the light incident end of the light waveguide through the first light hole.

7. The optical communication device of claim 5, wherein the first board comprises a first side surface, a second side surface opposite to the first side surface, a plurality of first soldering pads formed on the first side surface, and a plurality of second soldering pads formed on the second side surface, the emitter is positioned on the first side surface and connected to the first soldering pads, and the first board is electrically connected to the printed circuit board by the second soldering pads.

8. The optical communication device of claim 7, wherein the first board defines a plurality of first connecting holes, each first connecting hole is corresponding to a first soldering pad and a second soldering pad, the first connecting holes are filled with conductive material, each first soldering pad is connected to a corresponding second soldering pad by the conductive material in a corresponding first connecting hole.

* * * * *